United States Patent
Patzer

(10) Patent No.: US 11,480,300 B1
(45) Date of Patent: Oct. 25, 2022

(54) REFUELING ADAPTER FOR AN ALTERNATIVE FUEL VEHICLE AND METHOD FOR REFUELING

(71) Applicants: Hyundai Motor Company, Seoul (KR); Kia Corporation, Seoul (KR)

(72) Inventor: Thomas Patzer, Mainz (DE)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 0 days.

(21) Appl. No.: 17/527,668

(22) Filed: Nov. 16, 2021

(30) Foreign Application Priority Data

Sep. 6, 2021 (DE) .......................... 102021209795.2

(51) Int. Cl.
*F17C 5/00* (2006.01)
*F17C 13/04* (2006.01)
*B60K 15/04* (2006.01)
*F17C 13/02* (2006.01)
*B60K 15/03* (2006.01)

(52) U.S. Cl.
CPC .............. *F17C 5/007* (2013.01); *B60K 15/04* (2013.01); *F17C 13/025* (2013.01); *F17C 13/026* (2013.01); *F17C 13/04* (2013.01); B60K 2015/03315 (2013.01); F17C 2221/012 (2013.01); F17C 2250/034 (2013.01); F17C 2250/043 (2013.01); F17C 2250/0439 (2013.01); F17C 2250/0636 (2013.01); F17C 2265/065 (2013.01)

(58) Field of Classification Search
CPC ...... F17C 5/007; F17C 13/024; F17C 13/026; F17C 13/04; F17C 2250/034; F17C 2250/043; F17C 2250/0439; F17C 2250/0636; F17C 2265/065; B60K 2015/03315; B60K 15/04

USPC ..................................... 141/1, 100, 104–105
See application file for complete search history.

(56) References Cited

U.S. PATENT DOCUMENTS

| | | | | |
|---|---|---|---|---|
| 6,152,199 A | * | 11/2000 | Nusbaumer ............. | B67D 7/42 220/264 |
| 7,040,358 B2 | * | 5/2006 | Lacroix .................... | B67D 7/42 141/206 |
| 10,442,677 B2 | * | 10/2019 | Mitrovich ............ | B67D 7/3218 |
| 2004/0050450 A1 | * | 3/2004 | Lambert ................. | F16L 37/32 141/346 |
| 2008/0264516 A1 | * | 10/2008 | McGee .................... | B67D 7/42 141/206 |

(Continued)

*Primary Examiner* — Mary E McManmon
*Assistant Examiner* — Stephanie A Shrieves
(74) *Attorney, Agent, or Firm* — Fox Rothschild LLP

(57) ABSTRACT

A refueling adapter for an alternative fuel vehicle includes a first filling port that is fluidly coupled to an inlet nozzle of a fuel tank of the alternative fuel vehicle. The first filling port is configured to fit an inlet nozzle of a first dispensing type. A second filling port fluidly coupled to a dispenser nozzle of an alternative fuel dispenser. The second filling port is configured to fit a dispenser nozzle of a second dispensing type, the second dispensing type being different from the first dispensing type. An adapter controller is configured to communicate with a vehicle fueling system of the alternative fuel vehicle and a valve providing a fluid connection between the first filling port and the second filling port and is operated by the adapter controller to selectively open and close the fluid connection.

17 Claims, 3 Drawing Sheets

(56) References Cited

U.S. PATENT DOCUMENTS

| | | | |
|---|---|---|---|
| 2011/0247726 A1* | 10/2011 | Okawachi | F17C 5/06 |
| | | | 141/82 |
| 2012/0192990 A1* | 8/2012 | Schulze | B67D 7/3209 |
| | | | 141/94 |
| 2017/0159856 A1* | 6/2017 | Mitrovich | B61C 17/00 |
| 2018/0186465 A1* | 7/2018 | Gammon | B64F 1/28 |
| 2018/0375536 A1* | 12/2018 | Emori | H04B 1/02 |

* cited by examiner

REFUELING ADAPTER FOR AN ALTERNATIVE FUEL VEHICLE AND METHOD FOR REFUELING

CROSS-REFERENCE TO RELATED APPLICATION

This application claims under 35 U.S.C. § 119(a) the benefit of priority to German Patent Application No. 10-2021-209795.2 filed on Sep. 6, 2021, the entire contents of which are incorporated herein by reference.

TECHNICAL FIELD

The present invention pertains to a refueling adapter for an alternative fuel vehicle, an alternative fuel vehicle with such an adapter and a method for refueling an alternative fuel vehicle.

BACKGROUND

Due to a combination of factors, such as environmental concerns, high oil prices and the potential for peak oil, development of cleaner alternative fuels and advanced power systems for vehicles has become a high priority for many governments and vehicle manufacturers around the world. Various solutions for alternative fuel vehicles running on alternative fuels have thus been increasingly contemplated in recent years. One particular example in this respect are hydrogen vehicles, which use hydrogen fuel for motive power. Such vehicles typically convert the chemical energy of hydrogen to mechanical energy either by burning hydrogen in an internal combustion engine or by reacting hydrogen with oxygen in a fuel cell to power electric motors.

In principle, hydrogen vehicles may be refilled at hydrogen refueling stations much in the same way as petroleum or other fuels may be refilled at a gas station. At the moment, there are mainly two filling pressures in common use around the world, namely H70 or 700 bar on the one hand and the H35 or 350 bar standard on the other. These two standards are not compatible with each other, which poses a hurdle when a vehicle designed for the 700 bar system is to be refilled at a 350 bar refueling station, for example. On the one hand, it is problematic, if not impossible, to connect such a vehicle to the refueling station mechanically. On the other hand, such a connection would raise safety concerns since higher temperatures in the fuel during the filling process would be expected since 350 bar refueling stations are equipped with high flow nozzles and do not have precooling. Moreover, such refueling stations are currently not equipped with IR communication, which means that the vehicle would not be able to automatically terminate the refueling process in case of overheating. Some companies offer intricate dispensing solutions that enable vehicles of both pressure ranges to be refueled at one dispenser unit in the shortest possible time. Accordingly, two filling units are provided, one for each pressure range, in one integrated dispenser unit.

SUMMARY

Hence, there is a need to develop a simplified yet flexible refueling solutions for alternative fuel vehicles. Accordingly, the present invention provides a refueling adapter in accordance with claim 1, an alternative fuel vehicle in accordance with claim 11 and a method in accordance with claim 12.

According to one aspect of the invention, a refueling adapter for an alternative fuel vehicle may include a first filling port configured to be fluidly coupled to an inlet nozzle of a fuel tank of the alternative fuel vehicle, wherein the first filling port is configured to fit an inlet nozzle of a first dispensing type; a second filling port configured to be fluidly coupled to a dispenser nozzle of an alternative fuel dispenser, in particular an alternative fuel pump, wherein the second filling port is configured to fit a dispenser nozzle of a second dispensing type, the second dispensing type being different from the first dispensing type; an adapter controller configured to communicate with a vehicle fueling system of the alternative fuel vehicle; and a valve providing a fluid connection between the first filling port and the second filling port and being operated by the adapter controller to selectively open and close the fluid connection.

According to another aspect of the invention, an alternative fuel vehicle may include a refueling adapter according to the invention. According to yet another aspect of the invention, a method for refueling an alternative fuel vehicle may include fluidly coupling a first filling port to an inlet nozzle of a fuel tank of the alternative fuel vehicle, wherein the first filling port is configured to fit an inlet nozzle of a first dispensing type; fluidly coupling a second filling port of a refueling adapter to a dispenser nozzle of an alternative fuel dispenser, in particular an alternative fuel pump, wherein the second filling port is configured to fit a dispenser nozzle of a second dispensing type, the second dispensing type being different from the first dispensing type; communicating via an adapter controller of the refueling adapter with a vehicle fueling system of the alternative fuel vehicle; and operating a valve of the refueling adapter, which provides a fluid connection between the first filling port and the second filling port, with the adapter controller to selectively open and close the fluid connection.

One idea of the present invention is to provide an adapter that may be used as an intermediary at a filling station to refuel a vehicle at a fuel dispenser in case that both fueling systems are a priori incompatible with each other. Accordingly, the adapter may be installed in-line between the inlet nozzle of the vehicle and the dispenser nozzle of the fuel dispenser to match the incompatible dispensing types of the vehicle and the fuel dispenser. The adapter may be configured as a plug-in device having a dispenser-side receptacle serving as first filling port and a vehicle-side receptacle serving as second filling port. The adapter may be provided, for example, by an operator of the filling station. Alternatively, or additionally, the vehicle operator may carry such an adapter on board of the vehicle. In principle, the adapter may also be installed inside the vehicle.

The invention thus provides a simplified yet highly practical solution that may be retrofitted and/or used as an in-situ remedy to adapt different fueling systems to each other that are by themselves incompatible. The adapter controller may be configured to adjust the opening and closing of the fluid connection between the vehicle and the fuel dispenser and may be in communication with the fueling system of the vehicle. Accordingly, it is possible to integrate the refueling process in a fail-safe way, since the process may be interrupted and/or prohibited in case of an emergency and/or a fault. As a consequence, alternative fuel vehicles may be used over a wider range and the number of potentially usable filling stations may be vastly increased depending on the respective use case and the available dispensing systems (e.g. for long haul trips, demo projects etc.).

Advantageous embodiments and improvements of the present invention are found in the subordinate claims.

According to an embodiment of the invention, the alternative fuel may comprise hydrogen. Hence, in one particular embodiment, the invention may be employed to fill up hydrogen powered vehicles at hydrogen refueling stations that are a priori incompatible with the filling systems of the respective vehicles.

According to an embodiment of the invention, the first dispensing type may operate under a first nominal working pressure and the second dispensing type may work under a second nominal working pressure, the first nominal working pressure being different from the second nominal working pressure. The present refueling adapter thus can match incompatible pressure systems with each other.

According to an embodiment of the invention, the first nominal working pressure may be 350 bar and the second nominal working pressure may be 700 bar. Alternatively, the first nominal working pressure may be 700 bar and the second nominal working pressure may be 350 bar. For example, currently there are no 700 bar hydrogen refueling stations (HRS) for commercial vehicles (CV) available in Europe (with capacity >10 kg). It is also not possible to refuel a 700 bar CV (capacity >10 kg) on a 350 bar HRS (capacity >10 kg), e.g. for buses. On the one side, it is mechanical not possible to connect these vehicles to the HRSs. On the other hand, and more importantly, this would not be secured as 350 bar HRSs are mainly equipped with high flow nozzles and in addition usually do not have precooling, which implies that higher temperatures are to be expected. Moreover, these systems—at least currently—do not feature IR-communication, hence a possible termination of the refueling process by intervention of the vehicle is not possible, e.g. in case of overheating.

With the present invention however, 700 bar CVs (capacity >10 kg) become refuellable on every 350 bar HRS (capacity >10 kg). The adapter provided by the invention can be installed in-line between a receptacle matching to the nozzles of the 350 bar HRSs and a nozzle matching to a 700 bar receptacle. For example, several 350 bar bus/truck HRSs are already available in the European Union. Furthermore, there is a growing grid of this HRS-type in Switzerland, for example.

According to an embodiment of the invention, the adapter controller may be configured to communicate via IR communication with the vehicle fueling system. For example, the system may use an IR-communication protocol as it is described in the current standard SAE J2799. The adapter controller may run a corresponding software that equates to this standard in order to receive and interpret the IR-communication from the vehicle side.

SAE J2799 specifies the communications hardware and software requirements for fueling Hydrogen Surface Vehicles (HSV), such as fuel cell vehicles, but may also be used where appropriate, with heavy duty vehicles (e.g., busses) and industrial trucks (e.g., forklifts) with compressed hydrogen storage. It contains a description of the communications hardware and communications protocol that may be used to refuel the HSV. The intent of this standard is to enable harmonized development and implementation of the hydrogen fueling interfaces.

Amongst others, the IR communication may be used as a control measure, in particular to be able to interrupt the refueling process in case of a malfunction, a pressure peak, an inacceptable increase in temperature or other complication. Accordingly, process parameters and/or process limits including fuel temperature, maximum fuel flow rate, pressure and/or pressure increase can be communicated via the IR interface. The vehicle refueling system may monitor these and other parameters of the refueling process and may inform the adapter accordingly, in particular in case of a malfunction or in case that a process limit is exceeded or about to be exceeded. The refueling adapter may then interrupt the refueling process accordingly and/or take other appropriate measures.

According to an embodiment of the invention, the adapter controller may be configured to operate the valve based on control signals received from the vehicle fueling system. In one particular example, the control signals may include commands that allow, prohibit and/or interrupt the refueling process. The system may use various control functions for this purpose to prevent malfunction of the refueling, e.g. in case of overheating, missing communication and so on.

According to an embodiment of the invention, the valve may be normally closed and the adapter controller may be configured to open the valve in case the control signals from the vehicle fueling system include an open valve signal. For example, the valve may be or may comprise a solenoid valve that is normally closed. As soon as the adapter is connected between the fuel dispenser and the vehicle, the vehicle may submit an appropriate command to open the valve and start the refueling process. This may be initiated automatically after the adapter is connected. Alternatively, the adapter may include a control element, e.g. an activation switch, button or the like, by which means an operator may activate the connected adapter. The adapter may then start the communication with the vehicle systems.

According to an embodiment of the invention, the refueling adapter may further include a power supply configured to supply the adapter controller and/or the valve with electric power. The power supply may comprise, for example, an electric battery or similar.

According to an embodiment of the invention, the valve may include two valve elements. A first valve element may be configured to open and close the fluid connection between the first filling port and the second filling port. A second valve element may connect the second filling port with a blow-off outlet of the refueling adapter and may be configured to bypass the fluid connection with the first filling port and blow-off the alternative fuel at the blow-off outlet when opened.

The first valve element thus may control opening and closing of the actual fluid connection between the first filling port and the second filling port. The second valve element on the other hand may be used for venting the fuel lines of the system before disconnecting the adapter, e.g. as soon as the vehicle tank is filled up and/or the refueling process is ended by the operator. Refueling may thus only be allowed by the adapter when the first valve element is open and the second valve element is closed. An ongoing refueling process may be finished or aborted by closing the first valve element. On the other hand, the fuel dispenser system may be configured to detect a pressure peak when the first valve element closes during refueling and may consequently interrupt the refueling. Subsequently, the second valve element may be opened for a short time to empty any fuel remaining within the adapter. In one particular example, one or both of these valve elements may be provided as (normally closed) solenoid valves, which may be powered by an integrated power source of the refueling adapter.

According to an embodiment of the invention, the refueling adapter may further include a pressure sensor configured to measure a fluid pressure of the alternative fuel along the fluid connection and/or a temperature sensor configured to measure a fuel temperature of the alternative fuel along the fluid connection. The adapter controller may be configured to operate the valve in case the measured fuel temperature and/or the measured fuel pressure exceeds a predefined threshold value and/or deviates from a predefined range.

Hence, the system may be complemented by several fail-safe mechanisms. For example, the system may be configured to detect a pressure peak and interrupt the refueling as a consequence (e.g. when the valves should close unexpectedly during the refueling process due to malfunction, missing power etc.). In another example, the system may be configured to detect a deviation from an expected temperature range. Moreover, the system may assess whether the blow-off process was successful by monitoring the fluid pressure accordingly. It is to be understood however that monitoring of crucial process parameters can also be done by the vehicle refueling system, which may communicate with the refueling adapter via an IR interface, for example.

The invention will be explained in greater detail with reference to exemplary embodiments depicted in the drawings as appended.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. In the figures, like reference numerals denote like or functionally like components, unless indicated otherwise.

Figure 1:
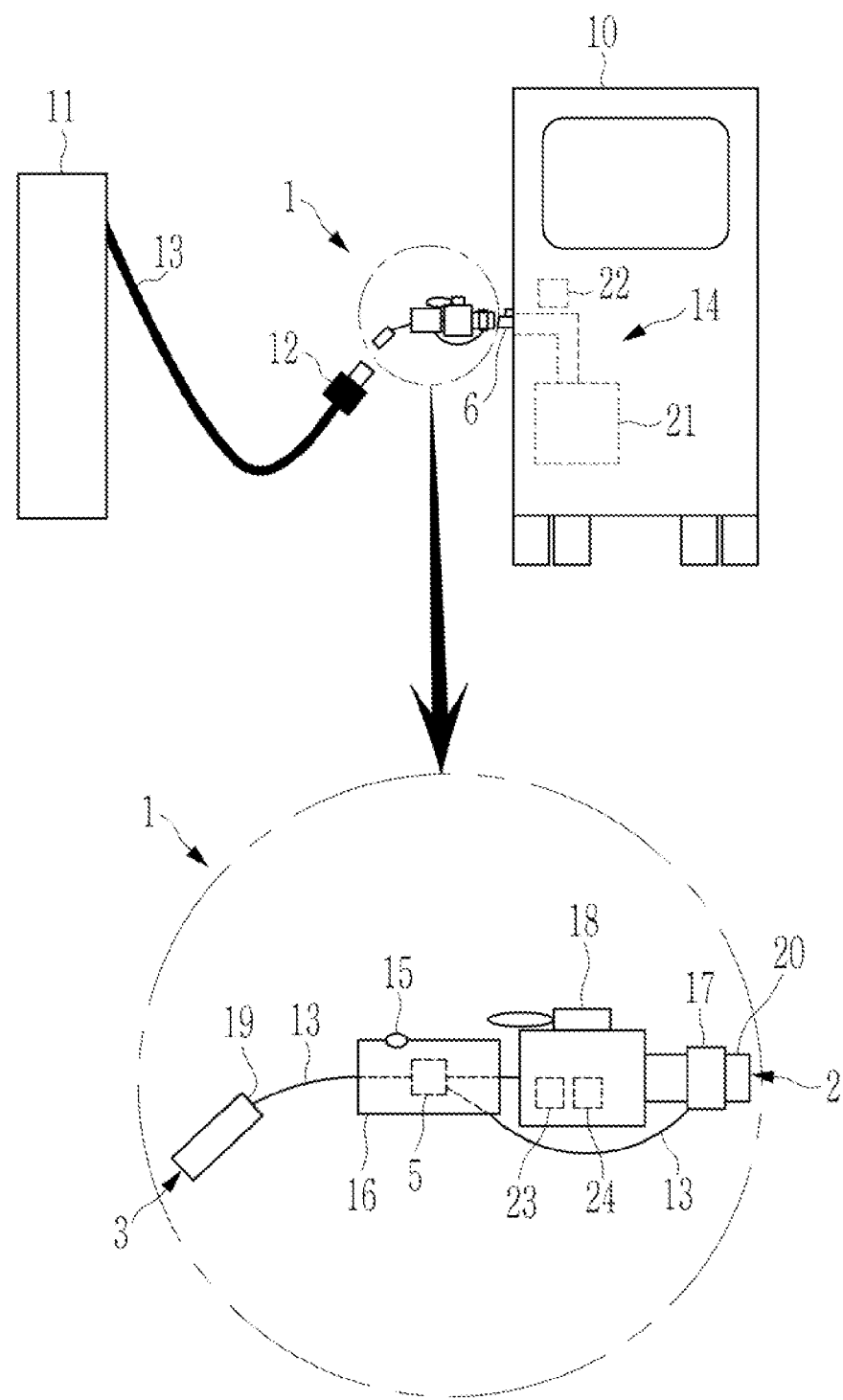
FIG. 1 schematically depicts a refueling adapter according to an embodiment of the invention used for refueling an alternative fuel vehicle.

Although specific embodiments are illustrated and described herein, it will be appreciated by those of ordinary skill in the art that a variety of alternate and/or equivalent implementations may be substituted for the specific embodiments shown and described without departing from the scope of the present invention. Generally, this application is intended to cover any adaptations or variations of the specific embodiments discussed herein.

DETAILED DESCRIPTION OF THE EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Figure 2:
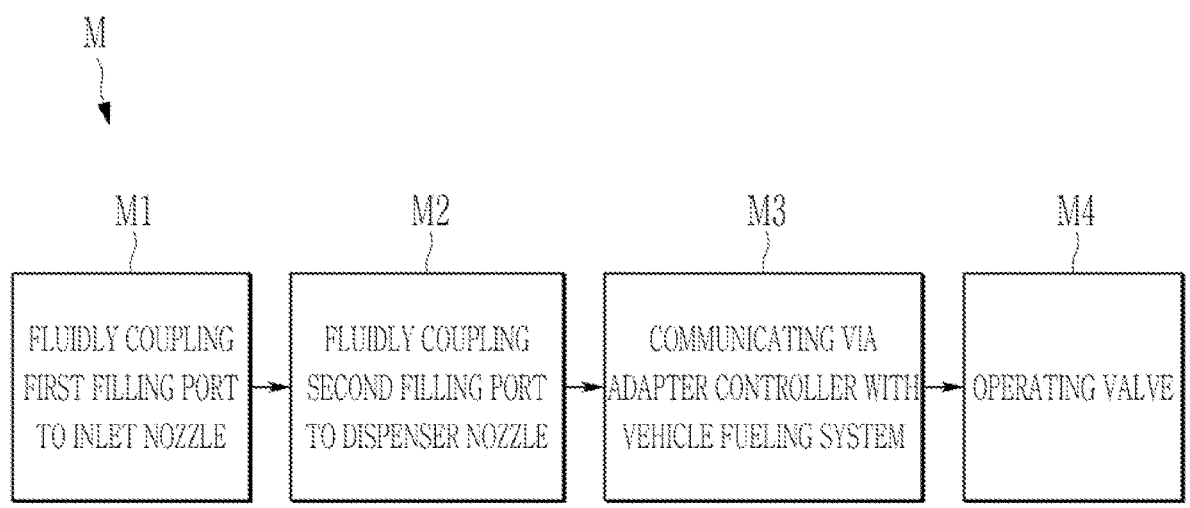
FIG. 2 shows a flow diagram of a method for refueling the alternative fuel vehicle of FIG. 1.
Figure 3:
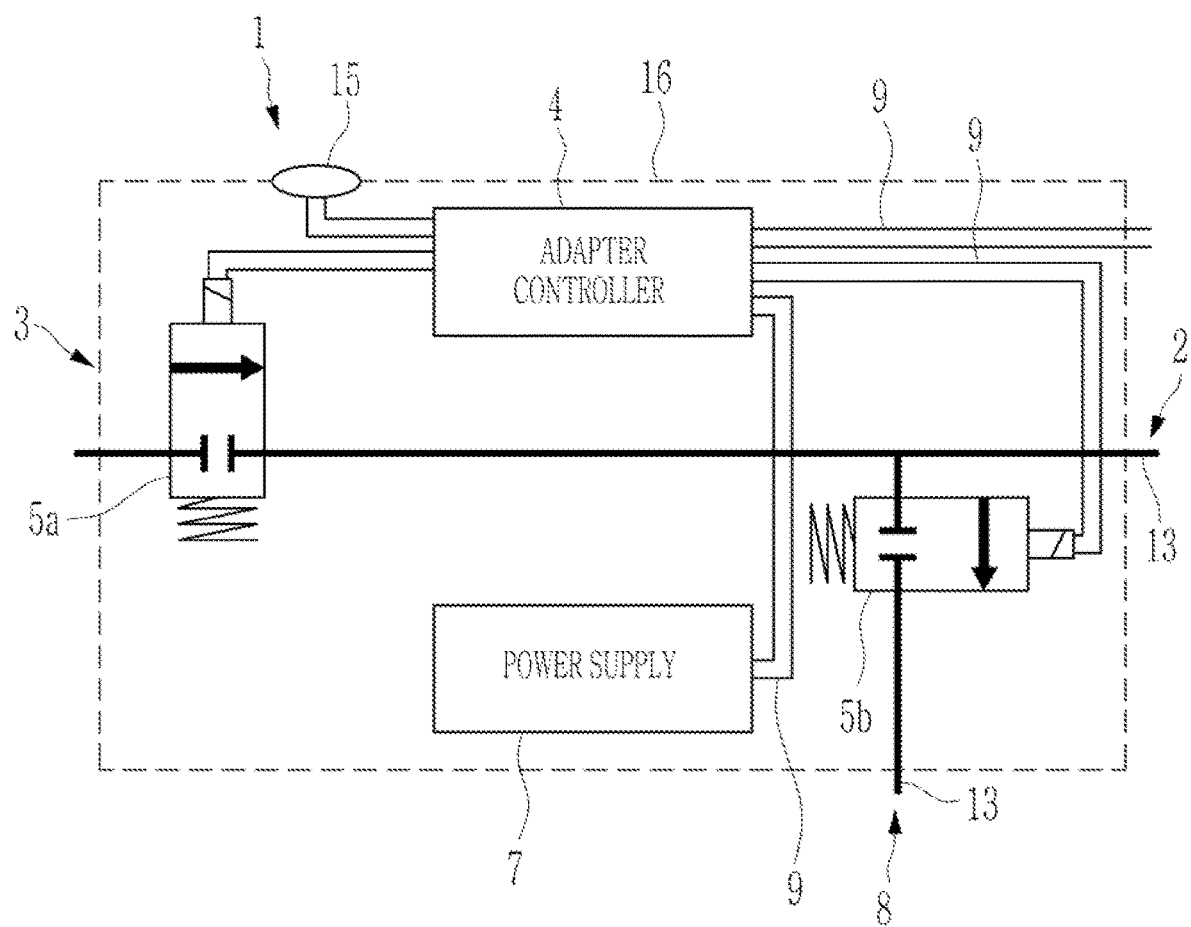
FIG. 3 shows a detailed view of the refueling adapter of FIG. 1.

FIG. 1 schematically depicts a refueling adapter 1 according to an embodiment of the invention used for refueling an alternative fuel vehicle 10 at a fuel dispenser 11. FIG. 2 shows a flow diagram of a method for refueling the alternative fuel vehicle of FIG. 1, while FIG. 3 depicts a detailed view of the refueling adapter of FIG. 1.

The alternative fuel vehicle 10 of this embodiment may be, for example, a bus, truck or other commercial vehicle or a passenger automobile that uses hydrogen as its primary source of power for locomotion. It is to be understood however that other alternative fuels may be used in other embodiments, e.g. natural gas, liquefied natural gas, liquefied petroleum gas and so on. Moreover, hydrogen may be used only as one of several sources of motive power, e.g. as part of a hybrid powertrain.

More specifically, the vehicle 10 may be a hydrogen internal combustion engine vehicle (HICEV), which is a modified version of the traditional gasoline-powered internal combustion engine and which combusts hydrogen instead of gasoline in its internal combustion engine. Alternatively, the vehicle 10 may also rely on fuel-cell conversion, in which the hydrogen is turned into electricity through fuel cells which then power an electric motor. With either method, the only byproduct from the spent hydrogen is water, and the process is entirely free of $CO2$ emissions, which is one reason why hydrogen is a particularly attractive alternative fuel.

The vehicle 10 may include a fuel tank 21 configured to store gaseous hydrogen, which may be filled into the fuel tank 21 via an inlet nozzle 6. The inlet nozzle 6 may be part of a vehicle fueling system 14 that is configured to comply with the H70 or 700 bar standard and maintains the hydrogen under a nominal working pressure of 700 bar. The vehicle fueling system 14 may be operated by a fueling system control 22, e.g. an electronic control unit (ECU).

The fuel dispenser 11 may be a hydrogen fuel pump, wherein a dispenser nozzle 12 may be used to fill up a vehicle with gaseous hydrogen. The fuel dispenser 11 may be adapted for a different dispensing type than the vehicle fueling system 14. For example, the fuel dispenser 11 may conform to the H35 or 350 bar standard for hydrogen refueling, which regulates the hydrogen under a nominal working pressure of 350 bar. In other embodiments, a reversed arrangement may be in place, in which the vehicle fueling system 14 is adapted for 350 bar, whereas the fuel dispenser 11 is adapted for 700 bar. In both cases however, the dispensing types of the vehicle fueling system 14 and the fuel dispenser 11 are incompatible with each other.

For example, the nozzles and inlets of a 350 bar system normally do not mechanically fit to the respective nozzles and inlets of a 700 bar system. Even disregarding this aspect, these systems should not be coupled with each other, at least not without additional measures, for reasons of safety. 350 bar systems typically use high-flow nozzles without precooling. 700 bar systems on the other hand rely on precooling and normal-flow nozzles. Hence, the high-flow on the one side and the missing precooling on the other might produce overheat when both systems are coupled to each other. Furthermore, modern 700 bar systems are usually adapted for wireless IR communication between the respective vehicle and the fuel dispenser, while the 350 bar systems do not have this capability. The IR communication is used in case of 700 bar systems as a control measure, in particular to be able to interrupt the refueling process in case of a malfunction, a pressure peak, an inacceptable rise in temperature or other complication. By coupling these incompatible systems, the possibility to terminate the fueling process would thus be compromised.

To improve this situation, the present approach provides a refueling adapter 1 that may be plugged between the dispenser nozzle 12 of the fuel dispenser 11 and the inlet nozzle 6 of the vehicle fueling system 14 in or to adapt both incompatible systems to each other. More specifically, the refueling adapter 1 may include a first filling port 2 at a vehicle-side receptacle 20 configured to be fluidly coupled to the inlet nozzle 6 of the fuel tank 21 of the alternative fuel vehicle 10. The refueling adapter 1 may further include a second filling port 3 at a dispenser-side receptacle 19 configured to be fluidly coupled to the dispenser nozzle 12 of the hydrogen fuel dispenser 11.

A valve 5 may be provided inside an adapter housing 16 to fluidly connect the first filling port 2 with the second filling port 3. Opening and closing of the valve 5 may be executed by an adapter controller 4, e.g. an electronic controller, which is in communication with the vehicle fueling system 14 of the alternative fuel vehicle 10 via IR communication. Accordingly, the refueling adapter 1 is provided with an IR interface 17 adapted to comply with the SAE J2799 standard. Hence, the adapter controller 4 may be configured to receive and interpret IR-communications transmitted from the vehicle refueling system 14. The data transmitted by the vehicle 10 is then used to control the valve 5.

The valve 5 may include two valve elements 5a, 5b, both of which are configured as normally closed solenoid valves. A first valve element 5a may be configured to open the fluid connection between the first filling port 2 and the second filling port 3 in case the control signals from the vehicle fueling system 14 include an open valve signal (left in FIG. 3). A second valve element 5b may connect the second filling port 3 with a blow-off outlet 8 of the refueling adapter 1 and may be configured to bypass the fluid connection with the first filling port 2 and blow-off the alternative fuel at the blow-off outlet 8 when opened. As shown in FIG. 3, the fuel lines 13 connecting the valve elements 5a, 5b may be arranged in a "T"-shape within the adapter housing 16 and continued as hoses outside of the adapter housing 16. The first valve element 5a thus may allow, prohibit or interrupt the refueling process. The second valve element 5b on the other hand is able to vent the system if required, in particular before the inlet nozzle 6 is disconnected.

The corresponding method M shown in FIG. 2 thus may include under M1 fluidly coupling the first filling port 2 to the inlet nozzle 6, under M2 fluidly coupling the second filling port 3 to the dispenser nozzle 12, under M3 communicating via the adapter controller 4 with the vehicle fueling system 14 and under M4 operating the valve 5, and thus the valve elements 5a, 5b, with the adapter controller 4 to selectively open and close the fluid connection and to selectively blow-off the alternative fuel at the blow-off outlet 8.

The solenoid valve elements 5a, 5b as well as the adapter controller 4 are fed with electric power by a power supply 7 integrated into the adapter 1, e.g. a battery or other suitable rechargeable and/or replaceable storage for electric energy. The adapter controller 4 and thus the refueling adapter 1 may be switched on and off by a manually operated control element 15, e.g. a push button. The control element 15 may be complemented by a status LED or other signaling element.

In the depicted embodiment, the refueling adapter 1 may further optionally include a pressure sensor 23 and a temperature sensor 24. The pressure sensor 23 may be configured to measure a fluid pressure of the alternative fuel along the fluid connection. The temperature sensor 24 may be configured to measure a fuel temperature of the alternative fuel along the fluid connection. Based on these measurements, the adapter controller 4 may be configured to operate the valve 5 in response to determining that the measured fuel temperature and/or the measured fuel pressure exceeds a predefined threshold value and/or deviates from a predefined range. For example, a deviation of the temperature from an acceptable range may be detected and the valve may be closed accordingly. In another example, the pressure may be monitored during the blow-off process to assess whether the blow-off was successful.

The refueling adapter 1 is thus able to assess a current status of the refueling process based on measured physical parameters and may interrupt the refueling in case these parameters leave a defined parameter range. On the other hand, termination of the refueling process may also be initiated by the vehicle refueling system 14 and/or the fuel dispenser 11. For example, when the first valve element 5a of the refueling adapter 1 should get closed during an ongoing refueling process for any reason, a pressure peak may be detected, e.g. by a corresponding sensor element of the fuel dispenser 11, which then may stop the delivery of hydrogen.

A typical refueling process may thus start by plugging the refueling adapter 1 to the inlet nozzle 6 of the vehicle 10 (control element 15 set to "off", status LED off). Next, the refueling adapter 1 may be activated by switching the control element 15 to "on". The status LED of the control element 15 may first glow yellow during establishment of the IR communication with the vehicle refueling system 14 and only may switch to green when this process is finished, indicating that the refueling adapter 1 is ready to use and that the refueling may be initiated. Next, the dispenser nozzle 12 of the fuel dispenser 11 may be plugged into the refueling adapter 1 and the refueling is started. As soon as the refueling is finished, the dispensing nozzle 12 may be disconnected from the refueling adapter 1 and the adapter 1 may be switched off. The LED of the control element 15 may then turn to yellow for a limited period of time, e.g. a few seconds, while a blow-off process is executed (hissing noise). As soon as the LED of the control element 15 goes off, the refueling adapter 1 may be disconnected from the vehicle 10.

In response to detect a malfunction or other incident (overheating, lost data link etc.) during the refueling process (first valve element 5a closed), the LED may turn to red indicating that the refueling process is interrupted. The dispenser nozzle 12 may then be disconnected from the refueling adapter 1. An operator may then wait until the LED switches back to green and retry refueling as soon as this is the case by reconnecting the adapter 1 with the dispenser nozzle 12.

In the foregoing detailed description, various features are grouped together in one or more examples with the purpose of streamlining the disclosure. It is to be understood that the above description is intended to be illustrative, and not restrictive. It is intended to cover all alternatives, modifications and equivalents of the different features and embodiments. Many other examples will be apparent to one skilled in the art upon reviewing the above specification. The embodiments were chosen and described to explain the principles of the invention and its practical applications, to thereby enable others skilled in the art to utilize the invention and various embodiments with various modifications as are suited to the particular use contemplated.

REFERENCE LIST 1 refueling adapter
2 first filling port
3 second filling port
4 adapter controller
5 valve
5a first valve element
5b second valve element
6 inlet nozzle
7 power supply
8 blow-off outlet
9 electric line
10 alternative fuel vehicle
11 fuel dispenser
12 dispenser nozzle
13 fuel line
14 vehicle fueling system
15 control element
16 adapter housing
17 IR interface
18 adapter dial
19 dispenser-side receptacle
20 vehicle-side receptacle
21 fuel tank
22 fueling system control
23 pressure sensor
24 temperature sensor
M method
M1-M4 method steps

What is claimed is:

1. A refueling adapter for an alternative fuel vehicle, comprising:
    a first filling port fluidly coupled to an inlet nozzle of a fuel tank of the alternative fuel vehicle, wherein the first filling port is configured to fit an inlet nozzle of a first dispensing type;
    a second filling port fluidly coupled to a dispenser nozzle of an alternative fuel dispenser, wherein the second filling port is configured to fit a dispenser nozzle of a second dispensing type, the second dispensing type being different from the first dispensing type;
    an adapter controller configured to communicate with a vehicle fueling system of the alternative fuel vehicle; and
    a valve providing a fluid connection between the first filling port and the second filling port and being operated by the adapter controller to selectively open and close the fluid connection.

2. The refueling adapter according to claim 1, wherein the alternative fuel comprises hydrogen.

3. The refueling adapter according to claim 1, wherein the first dispensing type operates under a first nominal working pressure and the second dispensing type works under a second nominal working pressure, the first nominal working pressure being different from the second nominal working pressure.

4. The refueling adapter according to claim 3, wherein the first nominal working pressure is 350 bar and the second nominal working pressure is 700 bar, or wherein the first nominal working pressure is 700 bar and the second nominal working pressure is 350 bar.

5. The refueling adapter according to claim 4, wherein the adapter controller is configured to communicate via IR communication with the vehicle fueling system.

6. The refueling adapter according to claim 5, wherein the adapter controller) is configured to operate the valve based on control signals received from the vehicle fueling system.

7. The refueling adapter according to claim 6, wherein the valve is normally closed and the adapter controller is configured to open the valve in case the control signals from the vehicle fueling system include an open valve signal.

8. The refueling adapter according to claim 7, further comprising a power supply configured to supply the adapter controller or the valve with electric power.

9. The refueling adapter according to claim 8, wherein the valve includes two valve elements, where in the two valve elements include a first valve element being configured to open and close the fluid connection between the first filling port and the second filling port, and a second valve element connecting the second filling port with a blow-off outlet of the refueling adapter and configured to bypass the fluid connection with the first filling port and blow-off the alternative fuel at the blow-off outlet when opened.

10. The refueling adapter according to claim 9, further comprising a pressure sensor configured to measure a fluid pressure of the alternative fuel along the fluid connection and/or a temperature sensor configured to measure a fuel temperature of the alternative fuel along the fluid connection, wherein the adapter controller is configured to operate the valve in response to determining that the measured fuel temperature or the measured fuel pressure exceeds a predefined threshold value or deviates from a predefined range.

11. An alternative fuel vehicle with a refueling adapter according to claim 1.

12. A method for refueling an alternative fuel vehicle, the method comprising:
fluidly coupling a first filling port to an inlet nozzle of a fuel tank of the alternative fuel vehicle, wherein the first filling port is configured to fit an inlet nozzle of a first dispensing type;
fluidly coupling a second filling port of a refueling adapter to a dispenser nozzle of an alternative fuel dispenser, wherein the second filling port is configured to fit a dispenser nozzle of a second dispensing type, the second dispensing type being different from the first dispensing type;
communicating via an adapter controller of the refueling adapter with a vehicle fueling system of the alternative fuel vehicle; and
operating a valve of the refueling adapter, which provides a fluid connection between the first filling port and the second filling port, with the adapter controller to selectively open and close the fluid connection.

13. The method according to claim 12, wherein the adapter controller communicates via IR communication with the vehicle fueling system.

14. The method according to claim 12, wherein the adapter controller is configured to operate the valve based on control signals received from the vehicle fueling system.

15. The method according to claim 14, wherein the valve is normally closed and the adapter controller is configured to open the valve in case the control signals from the vehicle fueling system includes an open valve signal.

16. The method according to claim 15, wherein the valve includes two valve elements, wherein the two valve elements include a first valve element selectively opening and closing the fluid connection between the first filling port and the second filling port, and a second valve element connecting the second filling port with a blow-off outlet of the refueling adapter and selectively bypassing the fluid connection with the first filling port and blowing-off the alternative fuel at the blow-off outlet when opened.

17. The method according to claim 16, further comprising measuring a fluid pressure of the alternative fuel along the fluid connection with a pressure sensor or measuring a fuel temperature of the alternative fuel along the fluid connection with a temperature sensor, wherein the adapter controller is configured to close the valve in case the measured fuel temperature and/or the measured fuel pressure exceeds a predefined threshold value.

\* \* \* \* \*